July 15, 1930. L. H. GORDON 1,770,400
GUARD RAIL FOR RAILROAD TRACK SCALES
Filed Nov. 14, 1929

Inventor.
Lucius H. Gordon
by Francis V. Dakin
Atty.

Patented July 15, 1930

1,770,400

UNITED STATES PATENT OFFICE

LUCIUS H. GORDON, OF MELROSE, MASSACHUSETTS

GUARD RAIL FOR RAILROAD TRACK SCALES

Application filed November 14, 1929. Serial No. 407,135.

This invention relates to a guard rail for railroad track scales employed in weighing freight cars and in other uses.

Railroad track scales which are in common use comprise a scale platform having rails in alignment with approach rails generally at both ends of the platform and being supported on a system of scale levers connected to suitable weight indicating means. When freight cars are pushed onto the scale platform from the approach rails or are moved from the platform to said rails there is apt to be some lateral movement of the platform on the supporting levers and to prevent any binding between the edges of the platform and the casing which surrounds it, which would prevent accurate weighings, there is a relatively wide clearance space between these parts. One consequence of the movement of the scale platform has been frequent derailments of cars due to the fact that the rails on the scale platform were not in alignment with the approach rails in which cases the flanges of the car wheels would strike the ends either of the approach or scale platform rails, ride up on top of the rails and slide off on the wrong side. Such derailments cause more or less damage to the cars and scales and frequently impede traffic for comparatively long periods of time.

The main object of the invention is the provision of a guard rail for use in connection with railroad track scales for preventing derailments when cars are moved either on or off the scales.

A further object is the provision of a guard of such form that it will tend to restore the scale rails to alignment with the approach rails in the operation of moving a car onto or off the scale platform.

An additional object is to provide a guard which will not interfere with the making of repairs on the scale when necessary.

Another object of the invention is the provision of a guard simple and efficient in construction which may be applied to scales now in use at a comparatively low cost.

Other objects of the invention will be more specifically set forth and described hereinafter.

Figure 1:
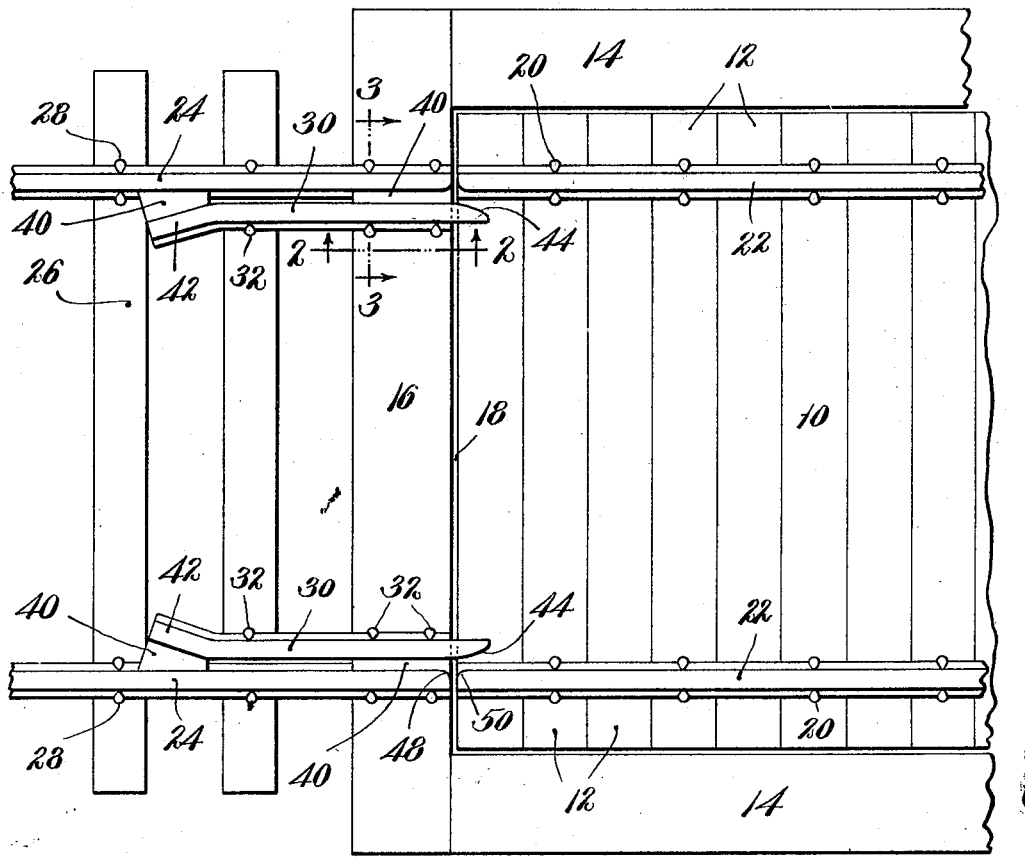
Figure 2:
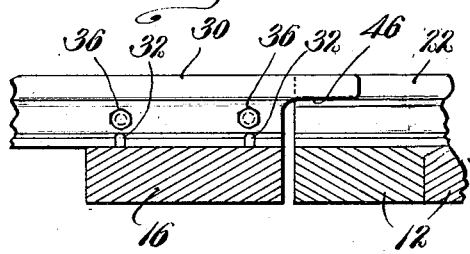

In the drawings showing, for the purpose of illustration, one form of the invention, Figure 1 is a plan view of one end portion of a railroad track scale with the adjacent approach tracks to which is applied a pair of guard rails constructed in accordance with the invention; Fig. 2 is a side elevation on line 2—2 in Fig. 1 looking upwardly; and Fig. 3 is a cross sectional view on line 3—3 in Figure 1 looking from left to right.

In the drawings there are shown only such parts of a railroad track scale as are necessary to illustrate the application of my invention thereto, which parts comprise a scale platform 10 made up of a flooring of boards or planks 12 supported and united into an integral structure and a casing surrounding the platform and consisting of side sills 14 and end sills 16. The scale levers which support the platform 10 and are housed in a pit underneath it and the other mechanisms of the scale are not shown because they are all of well known construction and are not material to a description of the invention. The scale platform, however, is solely supported upon the levers and to prevent any binding between the edges of the platform and the casing which would affect the accuracy of the weight indications, there is a clearance space 18 between those parts. The platform is provided with car rails 22 secured thereto by spikes 20 and the ends of said rails are cut flush with the ends of the platform. Leading to the scale rails are approach rails 24 fastened to suitable ties 26 by spikes 28 and these rails are generally provided at both ends of the platform although only one set is shown in the drawings. The ends of the approach rails contiguous to the ends of the scale rails are fastened to the end sill 16 and are cut flush with its inner edge. Normally, the approach rails are in accurate alignment with the scale rails but since there is necessarily some lateral movement of the scale platform on its system of supporting levers, especially when subjected to the weight of a freight or other car, the scale rails are sometimes out of such alignment and it is in such cases that derailments occur. The foregoing construction is all old and well known.

My invention consists in providing means for restoring the alignment of the scale platform rails with the approach rails whenever a car is moved onto or off the scale platform and one form of such means is shown comprising a pair of guards 30 which may be of any suitable form but are preferably rail sections of suitable lengths fastened to the end sill 16 and to one or more ties 26 by spikes 32 or in any other suitable manner. Each guard is preferably secured inside one of the approach rails with one end projecting a slight distance over the adjacent end of the scale platform. When rail sections are used as guards, the spikes 28 on the inner sides of the approach rails are withdrawn and the guards are set up close to the approach rails with their feet in engagement. Preferably, however, the inner edge of the foot 34 of the guard rail is trimmed off a slight distance as shown in Fig. 3 so that the guard rail may be set a little closer to the approach rail than would be possible if its foot was left untrimmed.

Figure 3:
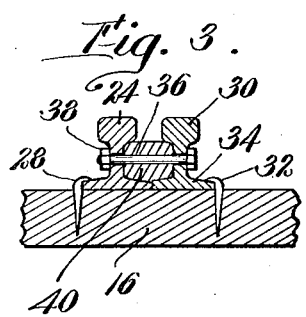

The guard rails may also be fastened each to its respective approach rail by bolts 36 and nuts 38 passing through the webs of the two rails and through filler blocks 40 interposed between the rails to form a compact unitary structure (Fig. 3). The guards may be of any suitable length but I have found a guard approximately three or four feet long will accomplish the desired results.

The two ends of each guard are flared inwardly and this may be done by bending the two ends of each guard in an inward direction as shown in the drawings. In the drawings the end of each guard projecting over the scale platform has, however, been shown as straight with that inner edge adjacent the scale rail cut away at 44 to form a flaring edge (Fig. 1).

In order to prevent the ends of the guard rails projecting over the scale platform from becoming frozen to the platform by accumulation of ice or snow in winter and to leave that end of the scale platform free from any possible contact with the guards, those portions of the guards below the ball of the rail projecting over the scale platform are removed as shown in Fig. 2 at 46 so that only the ball portion of each guard projects from the edge of the sill 16 over the scale platform. Not only does this form of construction eliminate any interference between the guard rails and the scale platform but it also permits the scale platform to be jacked up a limited distance for making minor repairs which are sometimes necessary and which can be accomplished by a slight jacking up of the scale platform to release the pressure on the levers.

I have also found it of advantage to round off the adjacent ends of the ball portions of the approach rails 24 and scale rails 22 on their inner sides at points 48 and 50 respectively which may contribute in extreme cases to the prevention of the flange of the wheel of a car moving onto or off the scale platform striking a square edge and riding up onto the end of one rail.

In use, when a car is moved onto the scale platform for weighing and the platform is moved laterally thereby so that the platform rails are out of alignment with the approach rails the guards will cause the platform to be moved back into alignment when the car is moved off the platform thereby preventing any derailment. The movement of the scale platform to one side will cause one of the rails thereon to move closer to the flared end of the guard rail with the result that when the car is started off the scale platform the flange of the first wheel enters the space between the flared end of the guard and the rail on which it is travelling and the resistance of the guard and the further travel of the wheel causes the scale platform to move back to normal position with its rails in alignment with the approach rails and the car travels on without possibility of derailment. The guards acting on the flanges of the car wheels correct the position of the scale platform at all times. The rounding of the inside corners of the approach rails adjacent the platform may contribute somewhat toward preventing derailment in cases of extreme lateral displacement of the platform since the flange of the first wheel passing off the scale platform on that side in the direction of movement of the platform will strike the curved corner of the approach rail the resistance of which supplements the resistance of the guard on the other side to restore alignment.

In moving a car onto the scale platform, the conditions are somewhat different because the scale platform when unloaded is generally in normal position or very nearly so. If out of alignment, however, one rail is moved inwardly in which case the flange of the first car wheel moving onto the platform will impinge against the curved inner corner of that rail and move the platform laterally into normal position. As a matter of fact, the greater proportion of derailments takes place in moving a car off the scale which is one reason for associating the guards with the approach rails.

It will be observed that my guard is of simple construction, very easily applied and of low cost since it may be made of scrap rail and is preferably of the same weight as the approach rail. It is as easily removed in case major repairs are to be made on the scale which requires the scale platform to be lifted higher than the clearance permitted by the undercut ends of the guards but in such event, all that is necessary is to loosen the spikes on the inside foot of the rails, remove the bolts and slide the guard rails longitudinally to remove the projecting ends from over the scale platform.

The projecting of the ends of the guard over the scale platform is important because it causes the position of the scale platform in case it is out of alignment to be corrected by the first wheel moving from the scale platform before it leaves the platform and it is important that the projecting ends of the guards be undercut in order that the accuracy of the scale may not be affected by the accumulation of snow or ice or dirt between the scale platform and the ball of the projecting ends.

In the illustrated embodiment of the invention, the guards are shown as associated with the approach rails which is the preferable arrangement because the scale platform is more apt to be out of alignment when subjected to the weight of a car thereon than at other times but in some cases it may be feasible to associate the guards with the platform rails which would be within the scope of my invention.

Although the guard rail of my invention is designed primarily for use in connection with railroad scales, and has been hereinbefore so described, it may be found adapted for other uses in connection with railroads and therefore I do not desire to be limited to any particular use.

It is to be understood that my invention is not to be limited to the exact construction shown and described since it may be embodied in various other forms within the purview of the following claims.

What I claim is:

1. A guard for railroad scales comprising an elongated member adapted to be secured inside of and adjacent to an approach rail of said scales and having one end adapted to project over one end of the scale platform, said projecting end having the foot and web thereof removed to afford a clearance between the ball of the rail at said end and said scale platform.

2. A guard for railroad scales comprising an elongated member adapted to be fastened inside of an approach rail and at a distance therefrom sufficient to accommodate the flange of a car wheel only, said member having its two ends flared inwardly away from said approach track and having one of said ends adapted to project over the platform of said scale, said projecting end having its foot and web portions removed to afford a clearance between the ball portion thereof and the scale platform.

3. A railroad guard rail comprising a rail section having its two ends turned laterally in the same direction and having the foot and web portions of one of said ends cut away to leave the ball of the rail extending outwardly.

4. A railroad guard rail comprising a rail section having one end turned laterally at an angle to the body of said section and having the foot and web portions of its other end removed and the ball portion of said end cut on the opposite side obliquely to the longitudinal axis of said section.

5. The combination with a scale for weighing freight cars having a platform provided with rails, of approach rails normally in alignment with the rails on the scale platform, a pair of guard rails mounted each inside one of the approach rails at that end thereof adjacent said scale platform, each of said guard rails having one end projecting over the end of said platform, said projecting end having its foot and web portions removed to afford a clearance between said end and said platform.

6. The combination of a railroad scale having a platform provided with a pair of rails for cars to be weighed, a pair of approach rails normally in alignment with the rails on said platform, a pair of guards mounted each inside one of said approach rails and in close relation thereto, each of said guards having one end projecting over the end of said scale platform and being flared inwardly to prevent derailment of cars when moving either onto or off said platform and said end having its lower portion removed and a ball portion only in order to afford a clearance between said ball portion and said scale platform.

7. The combination with a railroad track scale having a scale platform provided with rails for the passage of cars, a pair of approach rails normally in alignment with the rails on said scale platform, the adjacent ends of said platform rails and said approach rails being rounded on their inner corners, and a pair of guard rails mounted between said approach rails and having those ends adjacent said platform extending over said platform and being flared inwardly.

8. The combination with a railroad track scale having a scale platform provided with rails for the passage of cars, a pair of approach rails normally in alignment with the rails on said scale platform, the adjacent ends of said platform rails and said approach rails being rounded on their inner corners, and a pair of guard rails mounted between said approach rails and having those ends adjacent said platform extending over said platform and being undercut to afford a clearance between said ends and said scale platform.

9. The combination with a railroad track scale having a scale platform provided with rails for the passage of cars, a pair of approach rails normally in alignment with the rails on said scale platform and a pair of guard rails mounted between said approach rails, each of said guard rails being positioned close to one of said approach rails and fastened thereto with filler blocks between said guard rail and said approach rail, each of said guard rails having one end turned inwardly away from its adjacent approach rail and its other end projecting over one end of the scale platform and being cut away under the ball portion to afford a clearance space between said ball portion and said scale platform.

10. A railroad guard rail comprising a rail section having one end turned laterally at an angle to the main portion of said section and having the foot and web portion of its other end cut away entirely to leave the ball portion of the rail extending outwardly.

11. The combination with a railroad track comprising a pair of rails in fixed, separated, parallel relation, of a guard rail mounted inside of and contiguous longitudinally to one of said track rails, a pair of filler blocks interposed between the webs of said guard rail and said contiguous track rail and a plurality of bolts connecting said two rails together through said filler blocks; said guard rail having one end turned laterally away from said contiguous track rail and at its other end the ball of the rail cut diagonally on that side adjacent said contiguous track rail for guiding the flanges of car wheels on said contiguous track rail in between the same and said guard rail.

12. The combination with a railroad track comprising a pair of rails in fixed, separated, parallel relation, of a pair of guard rails mounted each inside of and adjacent to one of said first mentioned rails, each of said guard rails having one of its ends turned inwardly away from said adjacent rail and the foot and web portions of its other end removed.

In witness whereof, I hereunto set my hand this thirteenth day of November, 1929.

LUCIUS H. GORDON.